(12) United States Patent
Sundberg et al.

(10) Patent No.: US 7,407,903 B2
(45) Date of Patent: Aug. 5, 2008

(54) MATERIAL FOR HIGH TEMPERATURES

(75) Inventors: Mats Sundberg, Västerås (SE); Kjell Lindgren, Hallsjahammar (SE); Tamer El-Raghy, Philadelphia, PA (US); Gustav Malmqvist, Västerås (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 10/544,467

(22) PCT Filed: Jan. 27, 2004

(86) PCT No.: PCT/SE2004/000104

§ 371 (c)(1), (2), (4) Date: Jan. 17, 2006

(87) PCT Pub. No.: WO2004/069745

PCT Pub. Date: Aug. 19, 2004

(65) Prior Publication Data

US 2006/0194688 A1   Aug. 31, 2006

(30) Foreign Application Priority Data

Feb. 7, 2003   (SE) .................................. 0300318

(51) Int. Cl.
*C04B 35/56* (2006.01)
*C04B 35/581* (2006.01)

(52) U.S. Cl. .................. 501/87; 501/96.1; 501/96.5; 501/98.4

(58) Field of Classification Search ................ 501/96.5, 501/98.4, 87, 96.1
See application file for complete search history.

(56) References Cited

U.S. PATENT DOCUMENTS 5,328,875 A * 7/1994 Ueda et al. .................... 501/87

| | | | |
|---|---|---|---|
| 6,231,969 B1 * | 5/2001 | Knight et al. | 428/332 |
| 6,497,922 B2 * | 12/2002 | Knight et al. | 427/450 |
| 6,986,873 B2 * | 1/2006 | Sundberg et al. | 423/324 |
| 7,067,203 B2 * | 6/2006 | Joelsson et al. | 428/697 |
| 7,157,393 B2 * | 1/2007 | Gromelski et al. | 501/87 |
| 2003/0054940 A1 * | 3/2003 | Abe et al. | 501/96.4 |

FOREIGN PATENT DOCUMENTS

| CN | 1535917 | * 10/2004 |
|---|---|---|
| SE | 0102214-4 | 12/2002 |
| WO | 03/000618 A1 | 1/2003 |

OTHER PUBLICATIONS

Salama et al., "Synthesis and Mechanical Properties of $Nb_2AlC$ and $(Ti,Nb)_2 AlC$", Journal of Alloys and Compounds, vol. 347, 2002, pp. 271-278.

Khoptiar et al., "$Ti_2AlC$ Ternary Carbide Synthesized by Thermal Explosion", Materials Letters, vol. 57; 2002, pp. 72-76, paragraphs 1 and 4.

Ramaseshan et al., "Microstructure and Some Properties of $TiAl$-$Ti_2AlC$ Composites Produced by Reactive Processing", Intermetallics, vol. 7, 1999, pp. 571-577.

* cited by examiner

*Primary Examiner*—Karl E Group
(74) *Attorney, Agent, or Firm*—Drinker Biddle & Reath LLP

(57) ABSTRACT

The present invention relates to a material for use at temperatures exceeding 1200° C. and in oxidizing atmospheres consisting generally of an alloy between a metal, aluminium (Al) and carbon (C) or nitrogen (N). The invention is characterized in that the alloy has a composition $M_zAl_yX_w$ where M essentially consists of titanium (Ti), chromium (Cr) and/or niobium (Nb) and where X is carbon (C) or where X is nitrogen (N) and/or carbon (C) when M is titanium (Ti); and in that z lies in the range of 1.8 to 2.2, y lies in the range of 0.8-1.2 and w lies in the range 0.8-1.2, and wherein a protective oxide layer of $Al_2O_3$ is formed after heating to the mentioned temperature.

7 Claims, No Drawings

MATERIAL FOR HIGH TEMPERATURES

The present invention relates to a material designed for high temperatures.

The group of oxide-forming and corrosion-resistant high temperature materials used at temperatures higher than 1100° C. in the construction of i.a. heating elements and structural details in other high temperature applications includes, inter alia, $SiO_2$-forming material, such as silicon carbide (SiC), molybdenum silicide ($MoSi_2$), silicon nitride ($Si_3N_4$), and aluminium-oxide-forming material, such as FeCrAl, MeCrAlY and molybdenum aluminium silicide ($Mo(Si_{1-x}Al_x)_2$). NiCr alloys also form protective layers which develop a passivating layer of chromium oxide ($Cr_2O_3$) on the surface.

Aluminium oxide forming material according to the aforegoing are also more stable than $SiO_2$ and $Cr_2O_3$ builders in reducing environments such as in an hydrogen gas environment due to the fact that aluminium has a greater affinity to oxygen than chromium and silicon. These layers passivate the base material and thereby counteract their degradation at high temperatures in oxidising atmospheres and other atmospheres. The use of metallic high temperature alloys, such as FeCrAl, is limited due to deficient creep durability and deformation resistance at temperatures above 1300° C. Moreover, the limited amount of aluminium in the alloy shortens the length of life of the oxidation. Neither do NiCr alloys offer a useful alternative when the requirements are long oxidation life spans at temperatures above 1200-1300° C.

The present invention provides a material that has a long length of life in oxidising atmospheres at temperatures above 1200° C.

The present invention thus relates to a material for use at temperatures above 1200° C. and in oxidizing atmospheres consisting generally of an alloy between a metal, aluminium (Al) and carbon (C) or nitrogen (N), and is characterised in that the alloy has a composition $M_zAlyX$, where M essentially consists of titanium (Ti), chromium (Cr) and/or niobium (Nb), and where X is carbon (C) or where X is nitrogen (N) and/or carbon (C) when M is titanium (Ti); and in that z lies in the range of 1.8 to 2.2, y lies in the range of 0.8-1.2 and w lies in the range 0.8-1.2, and wherein a protective oxide layer $Al_2O_3$ is formed after heating to the mentioned temperature.

Swedish Patent Application No. 0102214-4 describes a method of producing a single phase composition $M_{n+1}A_zX_n$, where n lies in the range of 0.8-3.2 and where z lies in the range of 0.8-1.2, where M may be titanium (Ti), where X may be carbon (C) or nitrogen (N), and where A may be aluminium (Al). The method involves forming a powder mix of said metal, non-metal and the last mentioned elements or compounds of said elements, and igniting the powder mix under an inert atmosphere so as not to promote disassociation, wherewith the ingoing components react, and wherein the method is characterised by causing the reaction temperature to stay at or above the temperature at which said components are caused to react but beneath the temperature at which the single phase composition will disassociate.

The present invention is based on the surprising discovery that in a ternary phase diagram Ti—Al—C, the material $Ti_2AlC$ and a material that has a composition which is in the vicinity of the composition of $Ti_2AlC$ has surprisingly good properties, these properties not being shown outside the narrow intervals set forth in claim 1. The same applies to $Ti_2AlN$.

The same also applies when the metal Ti is replaced with chromium (Cr) and/or niobium (Ni), either totally or partially.

According to the present invention, X may also be nitrogen (N) and/or carbon (C), provided that M is then titanium (Ti).

One advantage afforded by the present invention is that it makes possible applications at high temperatures in oxidising atmospheres in which metal alloys are unable to survive acceptable operating times at temperatures above 1200° C. and where the mechanical properties of intermetals, such as molybdenum alumino-silicides constitute a limitation, for instance result in limited resistance to thermal shocks.

According to one preferred embodiment of the invention, the metal (M) can be replaced partially with one of the elements or substances tantalum (Ta) and vanadium (V) as alloying substances in said alloy.

However, a particularly beneficial alloy in this context is an alloy that has the composition $Ti_zAl_yC_w$, where z lies in the range of 1.8 to 2.2, y lies in the range of 0.8-1.2 and w lies in the range 0.8-1.2, and wherein z, y and w are chosen so that the material will form a protective oxide layer of $Al_2O_3$ when heated.

In a preferred modification of said alloy, z=2.0, y lies in the range of 1.0-1.2 and w is 1.0.

The ternary carbide $Ti_3SiC_2$ has similar mechanical properties to the inventive material, although with the decisive drawback that titanium silicon carbide forms a rapidly growing non-passivating mix oxide of $TiO_2$ and $SiO_2$, which, in practice, makes it impossible to use the material in an oxidising environment for long periods of time at temperatures above 1100° C. in the absence of degradation of the material.

It should also be emphasised that when the inventive material is used under conditions with a sufficiently low partial pressure of oxygen to prevent the formation of aluminium oxide on the surface of the material, the material will remain intact in accordance with the formula $Ti_zAl_yX_w$.

The ternary phase $Ti_3AlC_2$ and nearby compositions will also form aluminium oxide on said surface under certain circumstances and can thus be used as a secondary phase in the material.

The inventive material may also include $Al_2O_3$, TiC and/or titanium alumndies.

Titanium carbide and titanium alumndies may be present in the material without negatively affecting the oxidation properties of composites of the inventive material.

$Al_2O_3$ can also be added as an amplifying phase in a composite of said material.

There now follows a working example.

1. 4000 g Ti, 1240 Al and 501 g C (corresponding to the composition $Ti_2Al_{1.1}C$) were mixed in powder form in a ball mill for a period of 4 hours.
2. The powder mix was placed in a tube-like furnace of aluminium oxide containing hydrogen gas.
3. The powder was heat-treated in accordance with the following cycles:

3° C./min. to a temperature of 400° C.

The powder was held at a temperature of 400° C. for a period of 4 hours.

2° C./min. to a temperature of 800° C.

The powder was held at the temperature of 800° C. for a period of 4 hours.

2° C./min. To a temperature of 1400° C.

The powder was held at a temperature of 1400° C. for 4 hours.
4. Natural cooling.
5. The reacted powder was crushed and ground to 325 mesh.
6. An XRD analysis of the powder showed that the main phase was $Ti_2AlC$ with the presence of some $Ti_3AlC_2$ and $Al_3Ti$.
7. A mixture of Ti, Al, C (according to the conditions in step 1) and 20 percent by weight of the reactive powder (step 5)

were packaged and placed in a water-cooled steel container. The container was evacuated and filled with pure argon gas.
8. The powder was ignited by electric heating. This process is known as SHS (Self propagating High temperature Synthesis).
9. The reacted material was cooled down naturally.
10. The reactive material was ground down to 325 mesh.
11. An XRD analysis of the powder showed that the main phase was $Ti_2AlC$ with the presence of some $Ti_3AlC_2$, TiC and $Al_3Ti$ (less than 10%).
12. The powder was cooled, cold pressed and sintered with nitrogen gas at 1500° C. for 1 hour.
13. Optical microscopy and an SEM (Sweep Electron Microscope) analysis of the sintered material showed that the sample was dense with a porosity smaller than 2%. Some grains of $Ti_3AlC_2$ were observed with less than 5% $TiAl_3$ at the grain boundaries. The grain size was in the order of 30 μm, with some grains in the order of 200 μm.
14. The sample was placed in an equipment for studying its oxidation properties. The sample was held at a temperature of 1100° C. for 8 hours, 1200° C. for 8 hours and 1300° C. for 8 hours. The oxidation course was found to be almost parabolic. The oxidation surface was bleach white, which indicates a thin oxide layer.
15. An SEM analysis showed that the oxide layer had a thickness of 5 microns and consisted of dense and adhering $Al_2O_3$.
16. Part of a sintered rod was polished down to 1000 grit.
17. This sample was placed in an equipment for studying its cyclic behaviour. The sample was held at 1200° C. for 4 hours and allowed to cool naturally. The cycle was repeated ten times.
18. The oxidation surface was bleach white, which indicates a thin oxide layer.
19. An SEM analysis showed that the oxide layer had a thickness of 3 μm and consisted of a dense and adhesive $Al_2O_3$.
20. A sintered rod was polished down to 1000 grit.
21. The sample was placed in an air-containing box furnace/?/at 1200° C. for 980 hours.
22. The oxidation surface was bleach white, which indicates a thin oxide layer.
23. The sample increased 10 mg in weight and had a white surface layer of $Al_2O_3$.

Another preferred application of the inventive material pertains to gas-heated or volatile fuel heated infrared heat radiators where the material functions as a radiation emitting surface. IR radiators of this kind are used, inter alia, in the paper industry for drying, moisture profiling and surface coating paper and similar materials. Such radiation emitting surfaces are conveniently in the form of plates. The plates may be constructed as plates that include through-passing holes, for instance with the hole pattern in the form of a honeycomb structure. Alternatively, the surface may, for instance, be constructed of a number of parallel thin-walled plates. The inventive material contributes towards a robust heat-radiating plate, due to its unique combination of good properties: these being a slow oxidation rate up to a temperature of 1400° C., good thermal conductivity, simplified workability in comparison with other ceramics (leading to lower manufacturing costs), the splendid ability to resist thermal shock, which places nd restrictions on design with sharp edges and varying material thicknesses.

The inventive material is electrically conductive with a resistivity of about 0.5 Ωmm2/m at room temperature and about 2.5 Ωmm2/m at 1200° C. In combination with the good mechanical properties of the material and its remaining high temperature properties, the material can be used advantageously as an electrical resistance element in both an oxidising and reducing atmosphere and under vacuum conditions. Other applications where the advantages afforded by the inventive material can be availed upon include for instance gas igniters, flame detectors, heater plugs and such usages. The use of the material in furnaces is not restricted to the example given above. In addition to such usages, the material may comprise parts or the whole of the following devices: trays, substrate holders, internal fittings/?/, support rollers, and so on.

The inventive material may also be used conveniently in powder form for surface coating purposes, e.g. with the aid of thermal spray methods, such as HVOF, plasma spraying or the like. Surface coating using vapour phase deposition processes with so-called PVD (Physical Vapour Deposition) and CVD (Chemical Vapour Deposition) are also possibilities of producing layers that are resistant to high temperature corrosion. When in the form of a circuit pattern designed for suitable electrical resistance, such surface coatings can also function as flat heating elements for heat treating silicon wafers or plates.

In addition to the aforesaid areas of use, the inventive material can also be used in respect of ethylene production tubes, heat exchangers, burner nozzles, gas turbine components, and so on.

Although the invention has been described above with reference to different applications, it will be evident to the person skilled in this art that the inventive material, can be used in other applications where the properties of the material are beneficial.

It will therefore be understood that the invention is not restricted to the aforedescribed exemplifying embodiment thereof but that variations and modifications can be made a within the scope of the following Claims.

The invention claimed is:

1. A material for use at temperatures exceeding 1200° and in an oxidizing atmosphere, the material comprising an alloy having a composition $M_zAl_yX_w$,
    wherein M is two different alloying metals comprising Ti+M', where M' is one of Cr and Nb,
    wherein X is carbon and/or nitrogen,
    wherein z is in the range of from 1.8 to 2.2, y is in the range of from 0.8 to 1.2, and w is in the range of from 0.8 to 1.2,
    wherein a protective layer of $Al_2O_3$ is formed after heating to temperatures exceeding 1200° C., and
    wherein the alloy includes one or more of $Ti_3AlC_2$, TiC and titanium aluminide as a secondary phase in an amount of from greater than zero to about 10 vol -%.

2. The material of claim 1 wherein z=2.0, y is the range of 1.0 to 1.2 and w=1.0.

3. The material of claim 1 wherein z=2.0.

4. The material of claim 1 wherein y is the range of 1.0 to 1.2.

5. The material of claim 1 wherein w=1.0.

6. The material of claim 1 wherein the secondary phase comprises $Ti_3AlC_2$ or titanium aluminide.

7. The material of claim 1, where M'=Nb.

* * * * *